(12) United States Patent  
Conradt et al.

(10) Patent No.: US 7,506,275 B2  
(45) Date of Patent: Mar. 17, 2009

(54) USER INTERFACE NAVIGATION

(75) Inventors: Jonathan I Conradt, Redmond, WA (US); Michael J. Darnell, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 415 days.

(21) Appl. No.: 11/276,455

(22) Filed: Feb. 28, 2006

(65) Prior Publication Data

US 2007/0200821 A1 Aug. 30, 2007

(51) Int. Cl.  
*G06F 3/048* (2006.01)
(52) U.S. Cl. .................. 715/857; 715/859; 715/861; 715/862; 715/834
(58) Field of Classification Search .......... 715/859, 715/857  
See application file for complete search history.

(56) References Cited

U.S. PATENT DOCUMENTS 7,254,785 B2 * 8/2007 Reed ........................ 715/834

2005/0132305 A1 * 6/2005 Guichard et al. ............ 715/855
2005/0210415 A1 * 9/2005 Bree ........................... 715/848
2006/0161871 A1 * 7/2006 Hotelling et al. ............ 715/863

* cited by examiner

*Primary Examiner*—Joshua D Campbell  
*Assistant Examiner*—Anil N Kumar  
(74) *Attorney, Agent, or Firm*—Lee & Hayes, PLLC

(57) ABSTRACT

User interface navigation is described. In an embodiment, an indicator displayed on a user interface rotates in place to indicate selectable directions of travel. When an input is received to stop the indicator from rotating, the indicator moves in a direction of travel. When another input is received, the indicator stops moving in the direction of travel, and again rotates in place to indicate other selectable directions of travel. An input can also be received to initiate selecting a user-selectable control on the user interface when the indicator is positioned over the user-selectable control, over a portion of the user-selectable control, or proximate the user-selectable control.

17 Claims, 7 Drawing Sheets

USER INTERFACE NAVIGATION

BACKGROUND

A conventional infra-red remote control device, such as a television-based remote control, has a high input latency which precludes using such a device for on-screen navigation, selection, and other operations that would typically require the use of a more responsive input device, such as a computer mouse or similar input device. Selecting an on-screen control, selecting an item from a list, or dragging an icon around on a display screen are just some examples of common user interface tasks that are difficult to complete when navigating a user interface with a high input latency device.

Additionally, portable hand-held devices typically do not include an external remote input device, and are implemented with a selection device such as a stylus, or a simple up-down and/or side-to-side navigable user interface. Due to size constraints, portable hand-held devices have limited input controls and are difficult to implement with the types of user interfaces that consumers have become accustomed to with desktop and laptop computers.

SUMMARY

This summary is provided to introduce simplified concepts of user interface navigation which is further described below in the Detailed Description. This summary is not intended to identify essential features of the claimed subject matter, nor is it intended for use in determining the scope of the claimed subject matter.

In an embodiment of user interface navigation, an indicator displayed on a user interface rotates in place to indicate selectable directions of travel. When an input is received to stop the indicator from rotating, the indicator moves in a direction of travel. When another input is received, the indicator stops moving in the direction of travel, and again rotates in place to indicate other selectable directions of travel. An input can also be received to initiate selecting a user-selectable control on the user interface when the indicator is positioned over the user-selectable control, over a portion of the user-selectable control, or proximate the user-selectable control.

In another embodiment of user interface navigation, a first button of a selection device corresponds to the indicator displayed on the user interface and is associated with a movement mode of the indicator. When the first button is selected, the indicator moves in a direction of travel, and when the first button is selected again, the indicator rotates in place to indicate selectable directions of travel. A second button of the selection device also corresponds to the indicator and is associated with a selection mode of the indicator When the second button is selected, a user-selectable control displayed on the user interface and proximate the indicator is selected.

BRIEF DESCRIPTION OF THE DRAWINGS

The same numbers are used throughout the drawings to reference like features and components.

DETAILID DESCRIPTION

Figure 1:
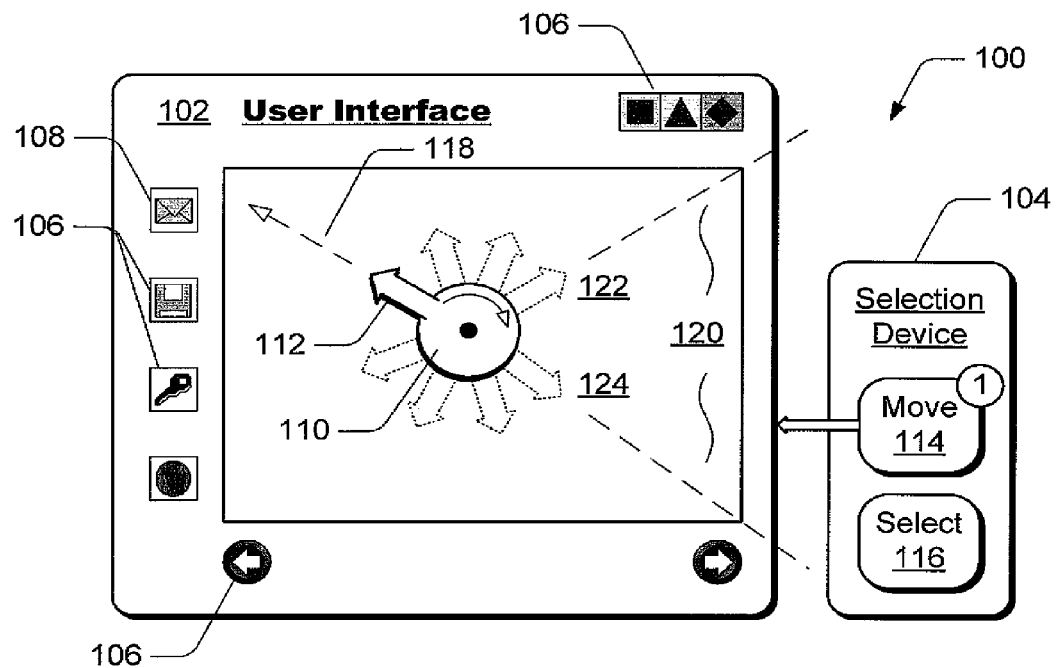
FIG. 1 illustrates an exemplary user interface navigation system in which embodiments of user interface navigation can be implemented.

User interface navigation is described in which embodiments provide mouse-like navigation features of a user interface utilizing only one or two input buttons of an input selection device, such as a television-based remote control. Embodiments of user interface navigation can also be implemented to assist users with limited mobility, or a motion disabled person, that can manipulate one or two input controls, either by way of button input selections, through breathing, movement, sound, or any combination thereof to input user selections.

A navigation indicator displayed on a user interface rotates in place to indicate selectable directions of travel. When an input is received to stop the indicator from rotating, the indicator moves in the selected direction of travel until a subsequent input is received to stop the indicator moving which again rotates in place to indicate other selectable directions of travel. As such, the navigation indicator can be moved in any direction around the user interface. An input can also be received to initiate selecting an icon or other user-selectable control on the user interface when the indicator is positioned over the user-selectable control, over a portion of the user-selectable control, or proximate the user-selectable control.

For a two input device user interface navigation system, such as two input buttons, a first input of a move button initiates the navigation indicator moving in a selected direction of travel. A second input of the move button stops the navigation indicator moving in the direction of travel, and initiates rotating the navigation indicator in place. An input of a select button then initiates selecting an item on the user interface, such as an icon or user-selectable control to start a computer-based application.

For a one input device user interface navigation system, such as one input button or other type of input mechanism, a first input of the input mechanism initiates the navigation indicator moving in a selected direction of travel, a second input of the input mechanism initiates rotating the navigation indicator in place on the user interface, and two inputs of the input mechanism in quick succession (like a "double-click") initiates selecting an item on the user interface if the navigation indicator is proximate the item. In an alternate one input embodiment, a first input of the input mechanism initiates the navigation indicator moving in a selected direction of travel, a second input of the input mechanism initiates rotating the navigation indicator in place on the user interface, and a third input of the input mechanism initiates selecting an item on the user interface if the navigation indicator is proximate the item. The inputs can then be cycled through to move the navigation indicator, stop and rotate the navigation indicator, and initiate selecting an item on the user interface.

While aspects of the described systems and methods for user interface navigation can be implemented in any number of different computing systems, environments, television-based entertainment systems, and/or configurations, embodiments of user interface navigation are described in the context of the following exemplary system architecture(s).

FIG. 1 illustrates an exemplary user interface navigation system 100 which includes an example of a user interface 102 and a selection device 104. The user interface 102 is merely an example that represents any type of Web-based user interface, a computing-based interface on a computer or portable device, a cellular phone and/or PDA (personal digital assistant) user interface, a GPS (global positioning system) user interface in a vehicle or on a portable device, a gaming system user interface, a television-based user interface such as a program guide or Web-based service accessed via a television-based entertainment system, and/or any combination or different type of user interface thereof.

In this example, the user interface 102 includes various user-selectable controls 106, such as user-selectable control 108 that can be selected by a user to initiate an email application. The user interface 102 also displays a navigation indicator 110 that has a direction indicator 112, both of which are displayed on the user interface to facilitate user navigation of the user interface, and a free range of motion around the user interface.

The selection device 104 includes a first input control identified in this example as a move button 114, and includes a second input control that is identified as a select button 116. The selection device 104 can be implemented with the two buttons 114, 116, or can be implemented with a single input control to implement embodiment(s) of user interface navigation. Additionally, the selection device 104 can be implemented as any one or combination of a television-based remote control device, as input controls on a portable computing-based device, and/or as any other type of input device.

The first input control 114 (i.e., the move button) on the selection device 104 corresponds to navigation indicator 110 displayed on the user interface 102, and is associated with a movement mode of the indicator. When the move button 114 is selected by a user, the navigation indicator 110 rotates in place on the user interface 102 to indicate various selectable directions of travel with the direction indicator 112, such as a direction of travel 118. Although the direction indicator 112 is shown outlined at various locations around the navigation indicator 110 to illustrate the rotation feature of the navigation indicator, the direction indicator 112 does not provide only the illustrated selectable directions of travel. In one embodiment, the navigation indicator 110 (to include the direction indicator 112) rotates "smoothly", much like the hands on a clock, so that a viewer can select any direction of travel in which to move the navigation indicator 110.

In another embodiment, the navigation indicator 110 (to include the direction indicator 112) can incrementally advance from one position to the next in a series of jumps along the path of rotation. Additionally, a determination can be made as to whether the navigation indicator 110 would encounter any user-selectable control 106 on the user interface 102 if selected to move in a particular direction of travel. In this example, there are no user-selectable controls in region 120 on user interface 102. As such, the navigation indicator 110 can skip past the selectable directions of travel within region 120 on the user interface 102.

In one embodiment, the navigation indicator 110 can skip from direction indicator position 122 to direction indicator position 124. In an alternate embodiment, a rate of rotation of the navigation indicator 110 can be increased when the direction indicator passes within region 120 from direction indicator position 122 to direction indicator position 124. This reduces the amount of time that the direction indicator 112 is indicating a direction of little or no use to the user, and makes it easier for the user to select a direction toward other targets positioned on the user interface 102. Similarly, if the navigation indicator 110 is moved to an edge of the user interface 102, the indicator can be implemented to skip past any selectable directions of travel towards the edge of the user interface because the indicator would no longer move in those directions.

In some instances, the available directions of navigation on the user interface 102 may be restricted to a few specific directions. A game, a maze, or an application "wizard" may include only two or three defined choices of controls or selectable directions of travel, in which case the indicator 110 can jump to each of the available selectable directions of travel rather than sweeping through directions that are not available as a choice. For example, the navigation indicator 110 may move to a T-intersection in a maze. At this point, the three defined options are to travel West, East, or South. By sweeping or jumping the direction indicator 112 directly from West to East and then to South, a user is able to choose from the only valid choices with less frustration, less time, and less chance of error.

Figure 2:
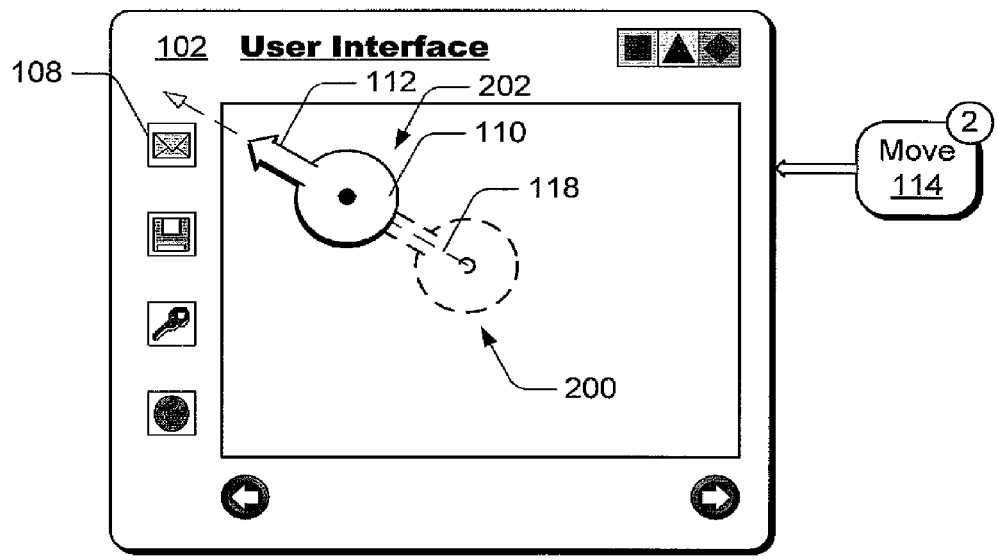
FIG. 2 further illustrates embodiment(s) of user interface navigation.

FIG. 2 further illustrates user interface 102 and the navigation indicator 110 shown in FIG. 1, as well as additional embodiment(s) of user interface navigation. When the move button 114 is again selected by the user, the navigation indicator 110 moves in the direction of travel indicated by the direction indicator 112. In this example, the navigation indicator 110 moves in the selectable direction of travel 118 towards the user-selectable control 108 from a first position 200 to a second position 202. Although not shown, the navigation indicator 110 (to include the direction indicator 112) would again rotate in place at position 202 if the user again selected the move button 114.

Figure 3:
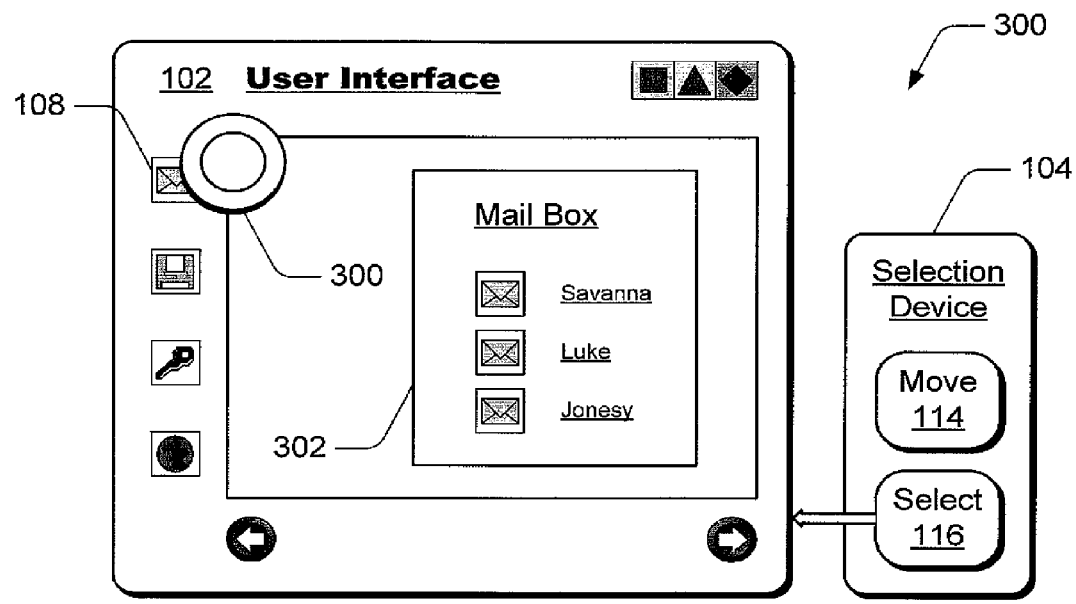
FIG. 3 further illustrates embodiment(s) of user interface navigation.

FIG. 3 further illustrates user interface 102, as well as additional embodiment(s) of user interface navigation. The user interface 102 displays a selection indicator 300 which is an alternate display of the navigation indicator 110 shown in FIGS. 1-2. The second input control 116 (i.e., the select button) on the selection device 104 corresponds to the selection indicator 300 on the user interface 102, and is associated with a selection mode of the indicator.

When the select button 116 is selected by the user, the navigation indicator 110 displays as the selection indicator 300 to indicate that a user-selectable control displayed on the user interface 102 is selected. For example, the selection indicator 300 indicates that user-selectable control 108 is selected to initiate email application 302. A user-selectable control displayed on the user interface 102 can be selected when the selection indicator 300 (or navigation indicator 110 prior to receiving a select input) is positioned over the user-selectable control, or optionally, when the indicator is positioned over a portion of the user-selectable control. Additionally, or in the alternative, a user-selectable control can be selected when the indicator is positioned closer to the user-selectable control than to an additional user-selectable control displayed on the user interface to assist a user when selecting an item. The user-selectable control can also be selected when the indicator is moving in the direction of a particular user-selectable control to further assist the user.

Figure 4:
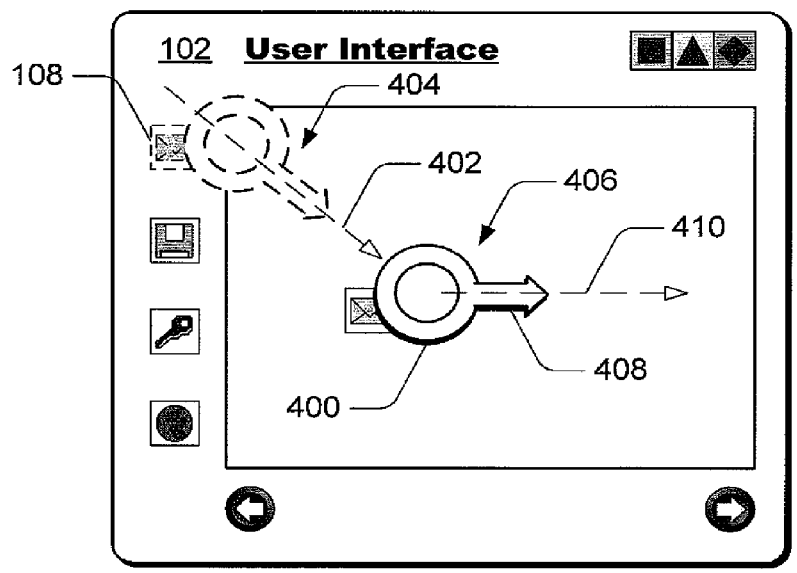
FIG. 4 further illustrates embodiment(s) of user interface navigation.

FIG. 4 further illustrates user interface 102, as well as additional embodiment(s) of user interface navigation. The user interface 102 displays a combination selection-move indicator 400 which is an alternate display of the navigation indicator 110 and the selection indicator 300 shown in FIGS. 1-3. When the select button 116 is selected by the user to select a user-selectable control displayed on the user interface 102 (as shown and described with reference to FIG. 3), the user can hold the select button 116 in place in conjunction with the move button 114 being selected. The indicator 400 then moves in a selected direction of travel 402 from a first position 404 to a second position 406 such that the user-selectable control is moved with the indicator 400. This is commonly referred to as "dragging" a selected item to relocate the item on the user interface 102. The selection-move indicator 400 also includes a direction indicator 408 which is illustrated to show a second selectable direction of travel 410 while moving the user-selectable control 108 across the user interface 102.

It should be noted that the navigation indicator 110 (FIGS. 1-2), direction indicator 112 (FIGS. 1-2), selection indicator 300 (FIG. 3), and combination selection-move indicator 400 (FIG. 4) are merely exemplary to illustrate features and embodiments of user interface navigation. Any one or combination of the indicators can be implemented with various and alternate design features to facilitate implementation of user interface navigation.

Figure 5:
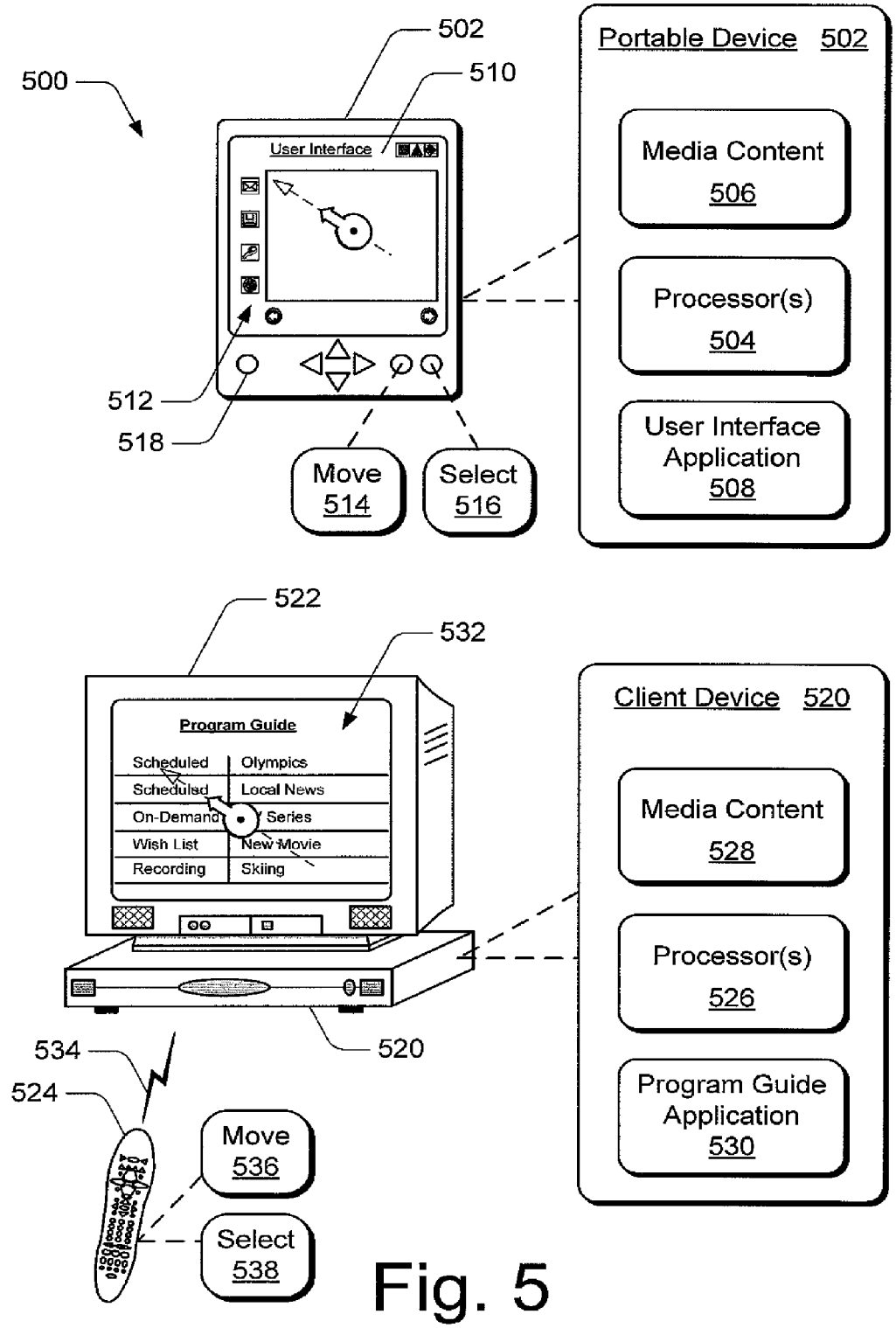
FIG. 5 illustrates exemplary implementations of user interface navigation.

FIG. 5 illustrates exemplary implementations 500 of user interface navigation. A portable computing-based device 502 can be any one or combination of a cellular phone, PDA, portable GPS device, a hand-held gaming device, and the like. In this example, the portable computing-based device 502 includes one or more processor(s) 504, media content 506, and a user interface application 508 which can be implemented as computer executable instructions and executed by the processor(s) 504 to implement embodiments of user interface navigation. Alternatively, or in addition, user interface navigation can be implemented as a device driver that is supported to operate in conjunction with the user interface application 508.

The media content 506 can include any form of audio, video, and/or image content which can be rendered and/or displayed for viewing as a user interface 510 on a display device 512 of the portable computing-based device 502. The user interface 510 also shows an example of user interface navigation, and specifically a navigation indicator with a direction indicator as described above. The portable computing-based device 502 includes input controls 514 and 516, which in this example, are a move input control and a select input control as described with reference to selection device 104 shown in FIGS. 1-2. Alternatively, the portable computing-based device 502 can be implemented with a single input control 518 to implement embodiment(s) of user interface navigation.

In an alternate implementation of user interface navigation, the computing-based device 502 can be implemented as a public kiosk rather than as a hand-held portable device. A wired input device to a public kiosk, such as a computer mouse, would likely be damaged rendering the kiosk unusable, or unreliable. Similar to the portable computing-based device 502, the public kiosk can be implemented with one or two input control buttons to control user interface navigation on a display device of the kiosk.

Another exemplary implementation 500 of user interface navigation includes a television-based client device 520, a display device 522, and a remote control device 524. The display device 522 can be any type of television, monitor, or similar television-based display system that renders audio, video, and/or image data. The client device 520 can be implemented in any number of embodiments, such as a set-top box, a digital video recorder (DVR) and playback system, an appliance device, a gaming device, and as any other type of client device that may be implemented in a television-based entertainment and information system.

In this example, client device 520 includes one or more processors(s) 526, media content 528, and a program guide application 530 which can be implemented as computer executable instructions and executed by the processor(s) 526 to implement embodiments of user interface navigation. Alternatively, or in addition, user interface navigation can be implemented as a device driver that is supported to operate in conjunction with program guide application 530. Additionally, client device 520 may be implemented with any number and combination of differing components as further described below with reference to the exemplary client device 900 shown in FIG. 9.

The media content 528 can be any form of program guide data, on-demand and/or broadcast media content such as programs, movies, commercials, music, interactive games, network-based applications and similar audio, video, and/or image content that client device 520 receives and/or records. Further, client device 520 may access or receive additional recorded media content that is maintained with a remote data store (not shown), such as from a video-on-demand server, or media content that is maintained at a broadcast center or content provider that distributes the media content to subscriber sites and client devices.

The program guide application 530 can be implemented to generate a program guide 532 which can be rendered and/or displayed for viewing on the display device 522. The program guide 532 also shows an example of user interface navigation, and specifically a navigation indicator with a direction indicator as described above. The client device 520 is implemented to receive user-selectable content navigation input commands 534, such as from the remote control device 524 which includes various configuration and television-specific input keys, an input keypad, and various user-selectable input controls. In addition, the remote control device 524 includes input controls 536 and 538, which in this example, are a move input control and a select input control as described with reference to selection device 104 shown in FIGS. 1-2. In one embodiment, the input controls 536 and 538 can be implemented as existing remote control device function inputs, such as the "play" and "fast-forward" inputs for example. Alternatively, the functions of user interface navigation can be implemented with a single input control on the remote control device 524 to implement embodiment(s) of user interface navigation.

Methods for user interface navigation, such as exemplary methods 600, 700, and 800 described with reference to respective FIGS. 6, 7, and 8, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 6:
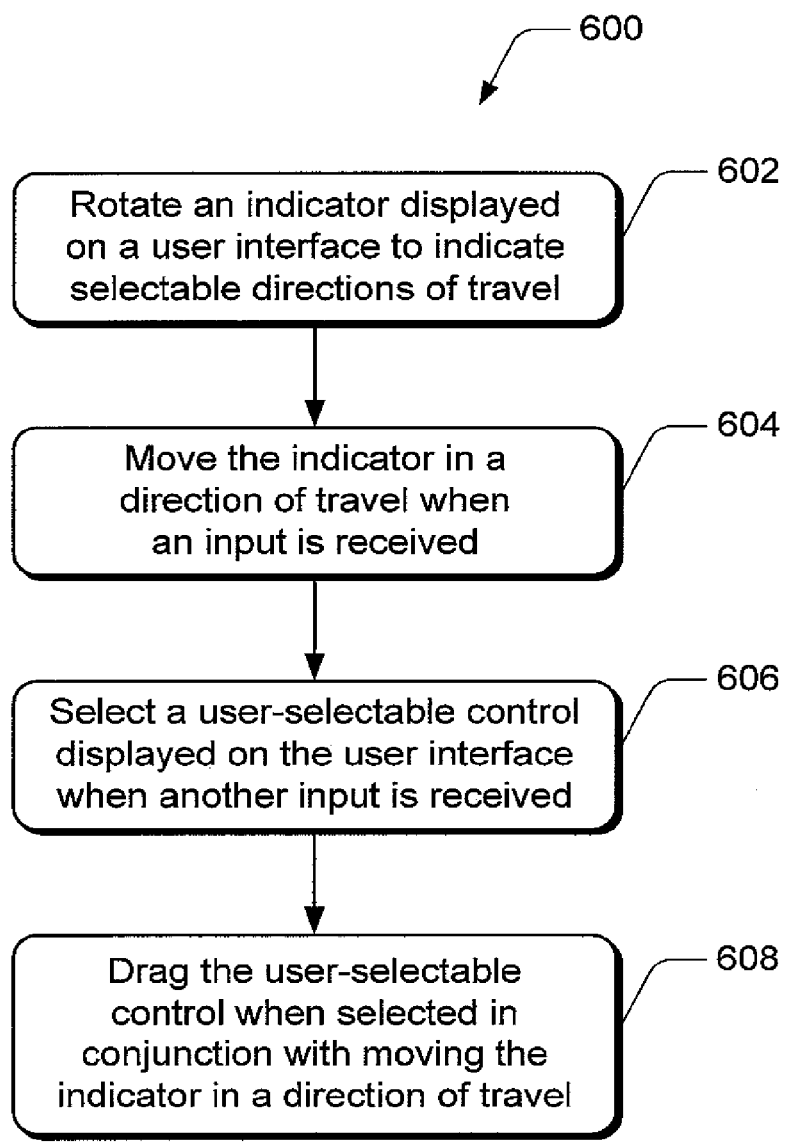
FIG. 6 illustrates exemplary method(s) for user interface navigation.

FIG. 6 illustrates an exemplary method 600 for user interface navigation and is described with reference to the user interface navigation system 100 shown in FIG. 1 and the exemplary user interface 102 shown in FIGS. 1-4. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 602, an indicator displayed on a user interface is rotated to indicate selectable directions of travel. For example, navigation indicator 110 (FIG. 1) rotates in place on user interface 102 to indicate various selectable directions of travel with the direction indicator 112, such as a direction of travel 118. The navigation indicator 110 (to include the direction indicator 112) rotates when an input is received, such as when a user selects the move button 114 on the selection device 104. At block 604, the indicator is moved in a direction of travel when an input is received. For example, the navigation indicator 110 (FIG. 2) stops rotating and moves in the selected direction of travel indicated by the direction indicator 112 when the move button 114 is again selected by the user.

At block 606, a user-selectable control displayed on the user interface is selected when another input is received. For example, selection indicator 300 (FIG. 3) indicates that user-selectable control 108 is selected on user interface 102 when the select button 116 on selection device 104 is selected by the user. A user-selectable control displayed on the user interface 102 can be selected when the selection indicator 300 (or navigation indicator 110 prior to receiving a select input) is positioned over the user-selectable control, or optionally, when the indicator is positioned over a portion of the user-selectable control. Additionally, or in the alternative, a user-selectable control can be selected when the indicator is positioned closer to the user-selectable control than to an additional user-selectable control displayed on the user interface. The user-selectable control can also be selected when the indicator is moving in the direction of the user-selectable control. Any of these selection options are inclusive of the indicator being proximate to the user-selectable control.

At block 608, the user-selectable control is dragged when selected in conjunction with moving the indicator in a direction of travel. For example, the combination selection-move indicator 400 (FIG. 4) indicates that the user-selectable control 108 is moved (i.e., "dragged") with the indicator as the indicator moves in a selected direction of travel 402 when the select button 116 on the selection device 104 is selected and held in place by the user in conjunction with the move button 114 being selected.

Figure 7:
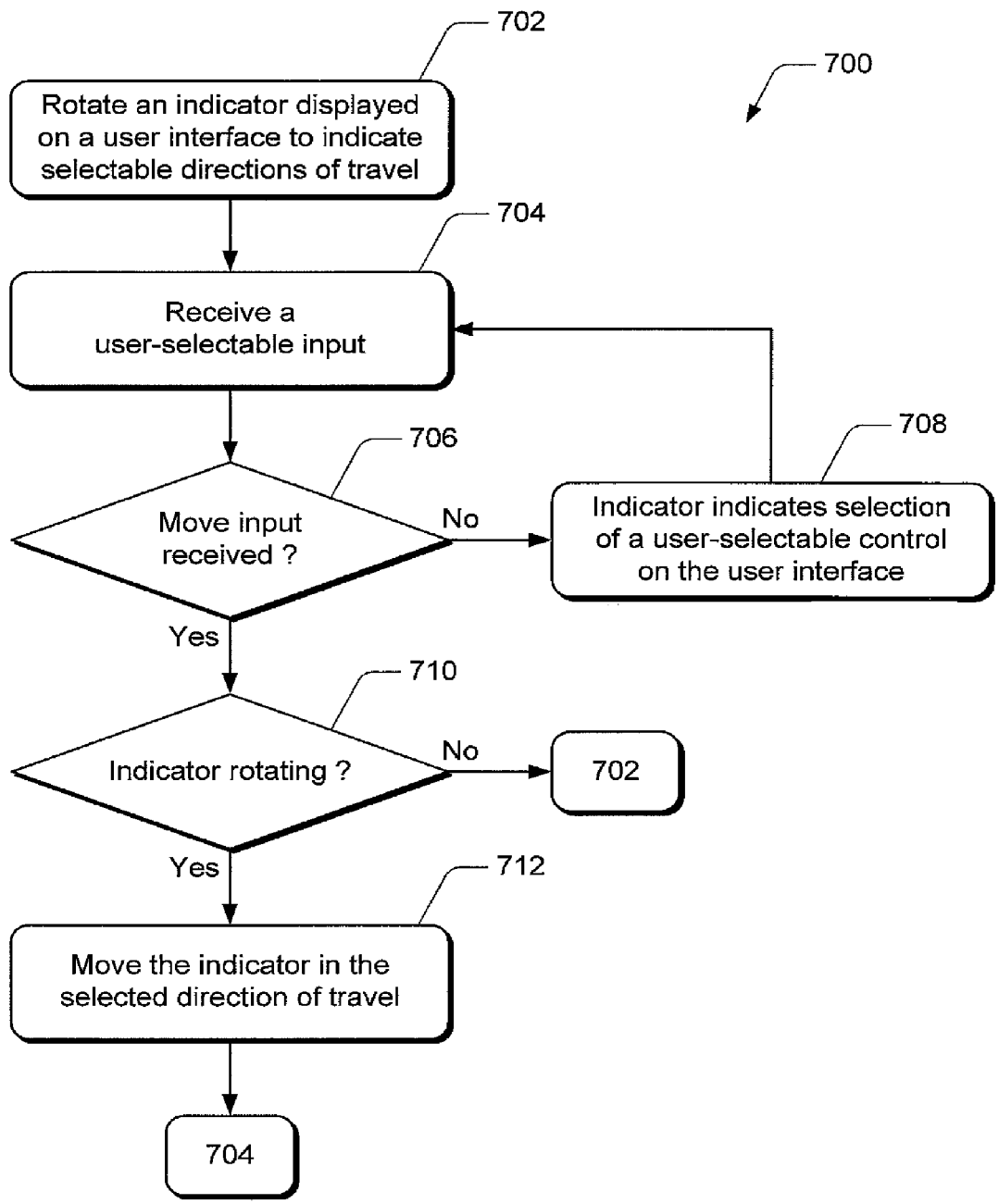
FIG. 7 illustrates exemplary method(s) for user interface navigation.

FIG. 7 illustrates an exemplary method 700 for user interface navigation and is described with reference to the user interface navigation system 100 shown in FIG. 1 and the exemplary user interface 102 shown in FIGS. 1-4. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 702, an indicator displayed on a user interface is rotated to indicate selectable directions of travel. For example, navigation indicator 110 (FIG. 1) rotates in place on user interface 102 to indicate various selectable directions of travel with the direction indicator 112, such as a direction of travel 118.

At block 704, a user-selectable input is received. For example, a user can enter a user interface navigation input from selection device 104 (FIG. 1) with the move input button 114 and/or the select input button 116. In various embodiments, a user can enter user interface navigation inputs from any type of input device, such as a television-based remote control device 524 (FIG. 5), one or two input control buttons of a portable device (502), or any other type of input device, to include a computer-based mouse and a breathing, movement, and/or sound input mechanism.

At block 706, a determination is made as to whether the user-selectable input is received as a move input, such as when a user initiates an input with the move button 114 on selection device 104. If the user-selectable input is not received as a move input (i.e., "no" from block 706), then the user-selectable input is a select input, such as when a user initiates an input with the select button 116 on selection device 104. If a select input is received, then the indicator indicates a selection of a user-selectable control (or other item) displayed on the user interface at block 708. For example, selection indicator 300 (FIG. 3) indicates that user-selectable control 108 has been selected on user interface 102. The method then continues at block 704 to receive a subsequent user-selectable input for user interface navigation.

If the user-selectable input is received as a move input (i.e., "yes" from block 706), then a determination is made as to whether the indicator is already rotating at block 710. If the indicator is not rotating (i.e., "no" from block 710), then the method returns to block 702 to initiate rotating the indicator displayed on the user interface. If the indicator is already rotating (i.e., "yes" from block 710), then the indicator stops rotating and moves in the selected direction of travel at block 712. The method then continues at block 704 to receive a subsequent user-selectable input for user interface navigation.

Figure 8:
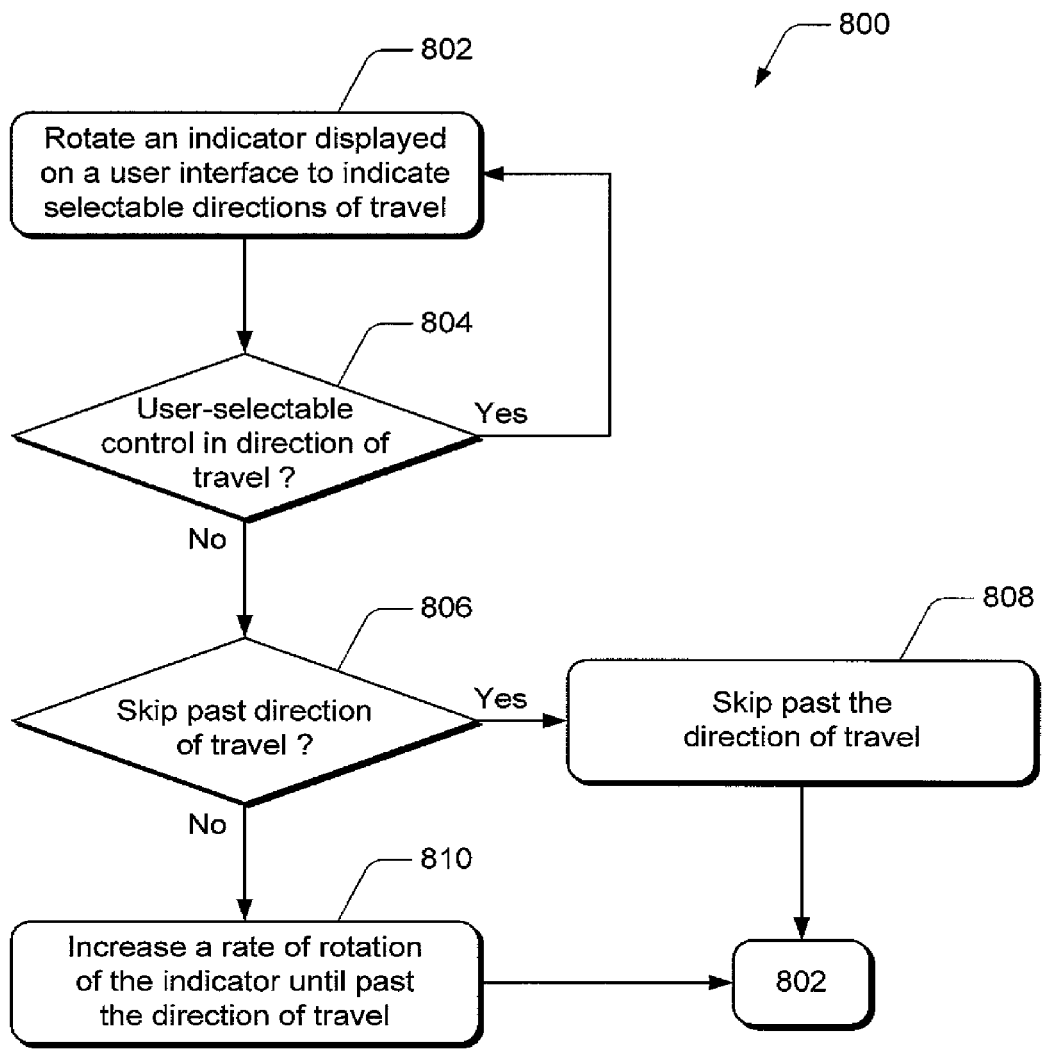
FIG. 8 illustrates exemplary method(s) for user interface navigation.

FIG. 8 illustrates an exemplary method 800 for user interface navigation and is described with reference to the user interface navigation system 100 shown in FIG. 1 and the exemplary user interface 102 shown in FIGS. 1-4. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 802, an indicator displayed on a user interface is rotated to indicate selectable directions of travel. For example, navigation indicator 110 (FIG. 1) rotates in place on user interface 102 to indicate various selectable directions of travel with the direction indicator 112, such as a direction of travel 118. At block 804, a determination is made as to whether the navigation indicator would encounter a user-selectable control if selected to move in a particular direction of travel.

If the navigation indicator would encounter a user-selectable control if selected to move in the direction of travel (i.e., "yes" from block 804), then the indicator continues to rotate in place at block 802. If the navigation indicator would not encounter a user-selectable control if selected to move in the direction of travel (i.e., "no" from block 804), then a determination is made as to whether to skip past the direction of travel at block 806.

If user interface navigation is implemented to skip past direction(s) of travel that would not encounter a user-selectable control (i.e., "yes" from block 806), then the method skips past the direction(s) of travel at block 808. For example, there are no user-selectable controls in region 120 on user interface 102. As such, the navigation indicator 110 can skip from direction indicator position 122 past the selectable directions of travel within the region 120 to direction indicator position 124 on the user interface 102. The indicator then continues to rotate in place on the user interface at block 802.

If user interface navigation is not implemented to skip past directions of travel that would not encounter a user-selectable control (i.e., "no" from block 806), then a rate of rotation of the indicator can be increased until past the direction(s) of travel that would not encounter a user-selectable control at block 810. For example, the rate of rotation of the navigation indicator 110 can be increased when the direction indicator 112 passes within region 120 from direction indicator position 122 to direction indicator position 124. The indicator then continues to rotate in place on the user interface at block 802.

Figure 9:
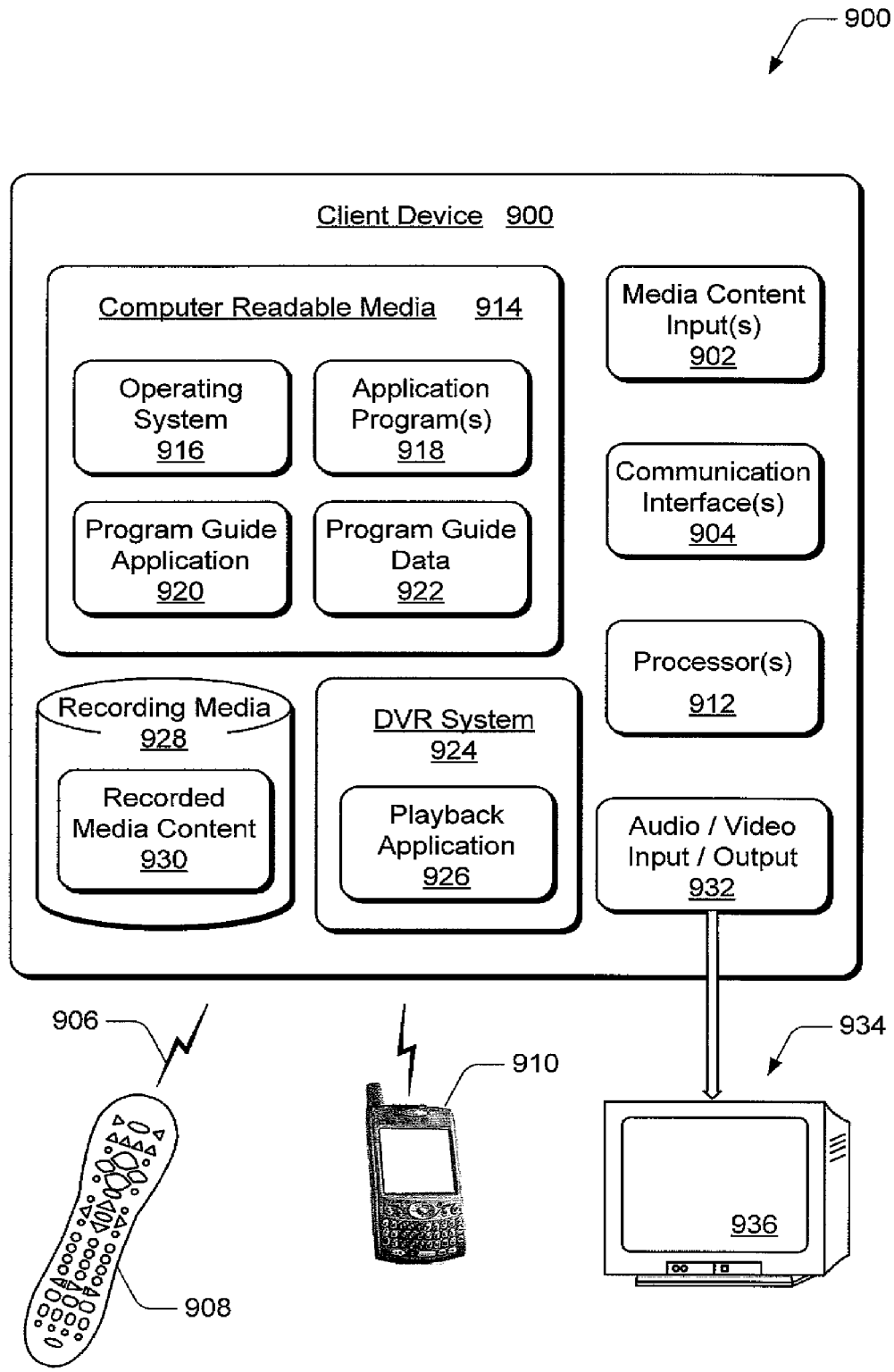
FIG. 9 illustrates various components of an exemplary client device in which embodiments of user interface navigation can be implemented.

FIG. 9 illustrates various components of an exemplary client device 900 which can be implemented as any form of a computing, electronic, and/or television-based client device, and in which embodiments of user interface navigation can be implemented. For example, the client device 900 can be implemented as the television-based client device 520 shown in FIG. 5.

Client device 900 includes one or more media content inputs 902 which may include Internet Protocol (IP) inputs over which streams of media content are received via an IP-based network. Device 900 further includes communication interface(s) 904 which can be implemented as any one or more of a serial and/or parallel interface, a wireless interface, any type of network interface, a modem, and as any other type of communication interface. A wireless interface enables client device 900 to receive control input commands 906 and other information from an input device, such as from remote control device 908, cellular phone 910 and/or combination PDA (personal digital assistant), or from another infrared (IR), 802.11, Bluetooth, or similar RF input device.

A network interface provides a connection between the client device 900 and a communication network by which other electronic and computing devices can communicate data with device 900. Similarly, a serial and/or parallel interface provides for data communication directly between client device 900 and the other electronic or computing devices. A modem facilitates client device 900 communication with other electronic and computing devices via a conventional telephone line, a DSL connection, cable, and/or other type of connection.

Client device 900 also includes one or more processors 912 (e.g., any of microprocessors, controllers, and the like) which process various computer executable instructions to control the operation of device 900, to communicate with other electronic and computing devices, and to implement embodiments of user interface navigation. Client device 900 can be implemented with computer readable media 914, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 914 provides data storage mechanisms to store various information and/or data such as software applications and any other types of information and data related to operational aspects of client device 900. For example, an operating system 916 and/or other application programs 918 can be maintained as software applications with the computer readable media 914 and executed on processor(s) 912 to implement embodiments of user interface navigation.

For example, client device 900 can be implemented to include a program guide application 920 that is implemented to process program guide data 922 and generate program guides for display which enable a viewer to navigate through an onscreen display and locate broadcast programs, recorded programs, video on-demand programs and movies, interactive game selections, network-based applications, and other media access information or content of interest to the viewer. The application programs 918 can also include a user interface navigation application to implement features and embodiments of user interface navigation as described herein. Alternatively, a programmed application can be implemented as a device driver, an integrated module, and/or a software component to implement embodiments of user interface navigation. The client device 900 can also include a DVR system 924 with playback application 926, and recording media 928 to maintain recorded media content 930.

The client device 900 also includes an audio and/or video output 932 that provides audio and video to an audio rendering and/or display system 934, or to other devices that process, display, and/or otherwise render audio, video, and image data. Video signals and audio signals can be communicated from device 900 to a television 936 (or to other types of display devices) via an RF (radio frequency) link, S-video link, composite video link, component video link, analog audio connection, or other similar communication link.

Although embodiments of user interface navigation have been described in language specific to structural features and/or methods, it is to be understood that the subject of the appended claims is not necessarily limited to the specific features or methods described. Rather, the specific features and methods are disclosed as exemplary implementations of user interface navigation.

The invention claimed is:

1. A user interface navigation system, comprising:

a processor;

a display device;

an interface display that displays on the display device, the interface display including a moveable and rotatable navigation indicator, the navigation indicator including a direction indicator that indicates one or more directions of travel; and an input device to communicate with the processor, the input device having a plurality of buttons, the plurality of buttons including:

a first button corresponding to the navigation indicator, the first button associated with a movement mode of the navigation indicator such that when the first button is selected, the navigation indicator moves in the interface display along one of the one or more of the directions of travel indicated by the direction indicator, and such that when the first button is selected again, the navigation indicator self-rotates in place at a location in the interface display such that the direction indicator sweeps through a plurality of directions of travel, the navigation indicator self-rotating until the first button is selected again; and a second button corresponding to the navigation indicator, the second button associated with a selection mode of the navigation indicator such that when the second button is selected, a user-selectable control displayed on the interface display and proximate the navigation indicator is selected.

2. A user interface navigation system as recited in claim 1, wherein when the second button is held in place when selected in conjunction with the first button, the navigation indicator moves in the direction of travel along with a selected item displayed on the interface display.

3. A user interface navigation system as recited in claim 1, wherein:

the navigation indicator self-rotates at a fist rate of rotation when the navigation indicator points in a direction that contains user-selectable controls; and the navigation indicator self-rotates at a second rate of rotation when the navigation indicator points in a direction that does not contain user-selectable controls, the second rate of rotation faster than the first rate of rotation.

4. A user interface navigation system as recited in claim 1, wherein when the navigation indicator self-rotates, the navigation indicator skips past directions of travel that do not contain user selectable control.

5. A user interface navigation system as recited in claim 1, wherein the user-selectable control displayed on the interface display is selected when the navigation indicator is positioned over the user-selectable control and the second button is selected.

6. A user interface navigation system as recited in claim 1, wherein the user-selectable control displayed on the interface display is selected when the navigation indicator is positioned over a portion of the user-selectable control and the second button is selected.

7. A user interface navigation system as recited in claim 1, wherein the user-selectable control displayed on the interface display is selected when the navigation indicator is positioned closer to the user-selectable control than to an additional user-selectable control displayed on the interface display, and when the second button is selected.

8. A user interface navigation system as recited in claim 1, further comprising a television-based remote control device that includes the first button and the second button to navigate the interface display when displayed on a television-based system.

9. A method for navigating a user interface that is displayed on an interface display of a display device, comprising:

receiving a first input from a first button that operates a navigation indicator displayed on the user interface, automatically rotating the navigation indicator displayed on the user interface in place to indicate selectable directions of travel when the first input is received;

receiving a second input from the first button that operates the navigation indicator displayed on the user interface;

stopping the navigation indicator from rotating and moving the navigation indicator in the user interface along a direction of travel when the second input is received;

receiving a third input from a second button that operates the navigation indicator displayed on the user interface; and selecting a user-selectable control display on the user interface that is proximate the navigation indicator when the third input is received.

10. A method as recited in claim 9, wherein the first input, the second input, and the third input are received from one or more user-selectable devices.

11. A method as recited in claim 9, wherein selecting the user-selectable control display comprises selecting the user-selectable control display when the navigation indicator is positioned over the user-selectable control and the third input is received.

12. A method as recited in claim 9, wherein selecting the user-selectable control display comprises selecting the user-selectable control display when the navigation indicator is positioned over a portion of the user-selectable control and the third input is received.

13. A method as recited in claim 9, wherein selecting the user-selectable control display comprises selecting the user-selectable control display when the navigation indicator is positioned closer to the user-selectable control than to an additional user-selectable control displayed on the user interface, and when the third input is received.

14. A method as recited in claim 9, further comprising:

dragging an item displayed on the user interface when selecting the item in conjunction with moving the navigation indicator in the direction of travel when the second input is received.

15. A method as recited in claim 9, further comprising varying the rate of rotation of the navigation indicator based on the location of the user-selectable controls on the user interface.

16. A method as recited in claim 9, wherein automatically rotating the navigation indicator comprises automatically rotating the navigation indicator such that the navigation indicator skips past directions of travel that do not contain any user-selectable controls.

17. An interface display of a user interface navigation system that is displayed on a display device, the interface display comprising:

an indicator that self-rotates in place at a location in a user interface to indicate selectable directions of travel when a first input from a first button is received at the navigation system, and that stops rotation at the location and moves in the user interface along a direction of travel when a second input from the first button is received at the navigation system; and an user interface control that is selected when the indicator is proximate the user interface control and a third input from a second button is received at the navigation system.

* * * * *